No. 712,532. Patented Nov. 4, 1902.
A. M. HEWLETT.
METHOD OF PREPARING CORES FOR CASTING.
(Application filed Feb. 17, 1902.)
(No Model.) 7 Sheets—Sheet 1.

Witnesses:

Inventor:
Alfred M. Hewlett,

No. 712,532. Patented Nov. 4, 1902.
A. M. HEWLETT.
METHOD OF PREPARING CORES FOR CASTING.
(Application filed Feb. 17, 1902.)

(No Model.) 7 Sheets—Sheet 2.

No. 712,532. Patented Nov. 4, 1902.
A. M. HEWLETT.
METHOD OF PREPARING CORES FOR CASTING.
(Application filed Feb. 17, 1902.)
(No Model.) 7 Sheets—Sheet 5.

No. 712,532. Patented Nov. 4, 1902.
A. M. HEWLETT.
METHOD OF PREPARING CORES FOR CASTING.
(Application filed Feb. 17, 1902.)

(No Model.) 7 Sheets—Sheet 7.

Fig. 10.

Witnesses
Inventor:

UNITED STATES PATENT OFFICE.

ALFRED M. HEWLETT, OF KEWANEE, ILLINOIS.

METHOD OF PREPARING CORES FOR CASTING.

SPECIFICATION forming part of Letters Patent No. 712,532, dated November 4, 1902.

Application filed February 17, 1902. Serial No. 94,439. (No model.)

*To all whom it may concern:*

Be it known that I, ALFRED M. HEWLETT, a citizen of the United States, residing at Kewanee, in the county of Henry and State of Illinois, have invented certain new and useful Improvements in Methods of Preparing Cores for Casting, of which the following is a specification, reference being had to the accompanying drawings.

Sand cores as usually employed in foundries are composed of sand mixed with some kind of a binder that will make the core very strong after it has been baked and cooled, and this binder must be of such a nature as to soften when the iron or brass comes in contact with it in the mold. The iron or brass when in a molten state must lie smoothly against the core, and if the binder or core compound is not softened by the heated metal, but remains hard, the metal will blow or not lie up to it; yet the core must be very strong in order to stand the strain when the molten metal first strikes the core. Oil, (principally linseed-oil,) rosin, molasses, and glucose are the principal bases for all binders or core compounds, and in order to bake cores made by these compounds it is necessary to have a heat sufficient to practically fuse the rosin, glucose, or other core compound, and when oil is used the heat must be sufficient to actually bake it dry. In the baking of cores it is of the utmost importance that they be subjected for the proper length of time to a suitable temperature; and my invention has to do with a method of operation by which this result may be accomplished. It is also important that the cores be properly cooled before being handled after baking, as while hot they are tender and easily susceptible to injury; and my invention also has to do with a method by which the cores are protected from injury until they have been cooled sufficiently, so that they are hard and not readily damaged.

My invention consists (a) in conducting the green cores continuous into, through, and out of a suitable oven or chamber heated throughout to a substantially uniform temperature. In this manner I make it possible to determine with a high degree of accuracy the extent to which the cores are baked, thereby avoiding all danger of under or over heating. It consists (b) in subjecting the cores while moving through such oven to the action of direct heat as distinguished from indirect or radiated heat, thereby providing a higher temperature and expediting the operation of baking as well as improving the character of the finished cores.

It consists (c) in conducting the cores into, through, and out of a suitable baking oven or chamber and in conducting said cores continuously for a sufficient space outside the oven to permit them to cool before being handled, thus avoiding the danger of breakage which invariably attends the handling of hot or warm cores.

In carrying out my improved process I prefer to employ an apparatus such as that illustrated in the accompanying drawings; but other forms of apparatus may be employed, provided they are so constructed and arranged as to carry out said process.

The apparatus illustrated forms the subject-matter of a separate application for patent of even date herewith.

In the accompanying drawings.

11 indicates the oven, the construction of which is best shown in Figs. 1, 5, 6, and 7.

Figure 1:
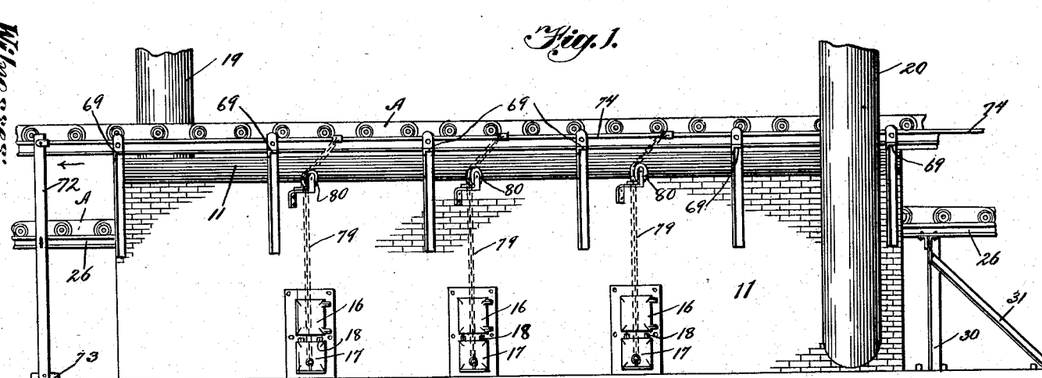
Figure 1 is a side elevation of an oven, showing parts of the carrier and supporting devices therefor.
Figure 2:
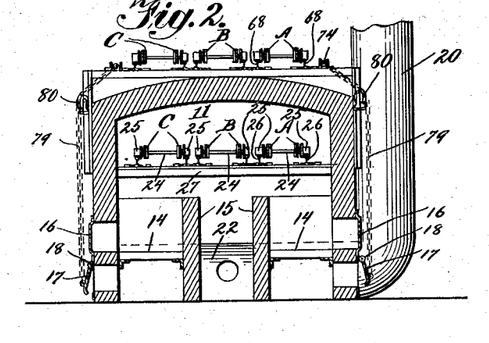
Fig. 2 is a cross-section on line 2 2 of Fig. 7.
Figure 5:
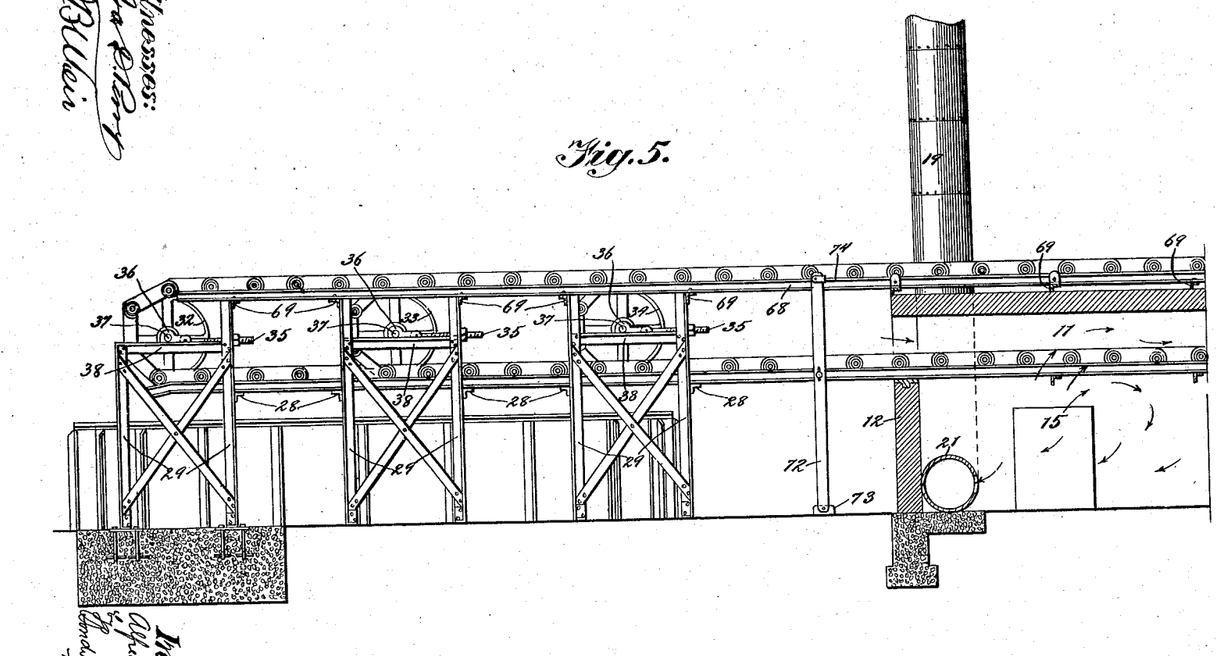
Fig. 5 is a side elevation of the carrying devices, the oven being in section, showing the receiving end of the apparatus.
Figure 6:
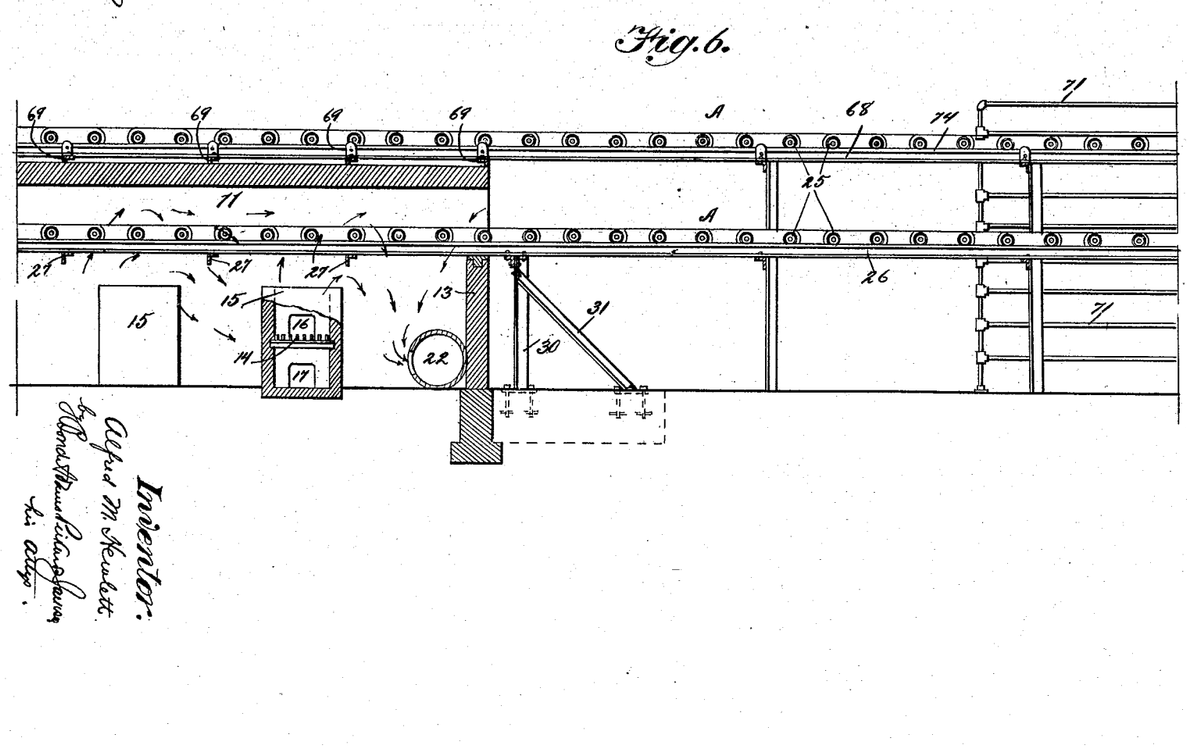
Fig. 6 is a similar view showing the outlet end of the oven, the carrier, and the receiving-racks for the cores.
Figure 7:
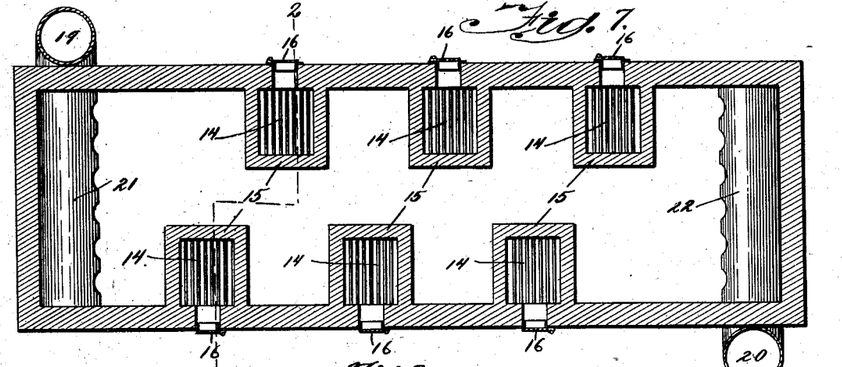
Fig. 7 is a horizontal section of the oven, showing the grates.

As shown in Figs. 2, 5, and 6, the oven 11 is considerably longer than it is wide and is open at both ends near the top, the openings extending from side to side. The upper edge of the front wall 12 of the oven forms the lower boundary of the opening at the inlet end of the oven, while the upper edge of the rear wall 13 forms the lower boundary of the outlet-opening. The oven 11 is provided with a plurality of grates 14, the number depending on the length of the oven. As shown in Fig. 7, the grates 14 are distributed equally at opposite sides of the oven and are placed at different distances from the ends thereof, the idea being to distribute the grates as nearly as possible throughout the area of the oven. Each of the grates 14 is inclosed by a wall 15, which forms three sides of a square and is open at the top, so that the heat may rise into the upper portion of the oven, where the cores are carried. Each grate is provided with upper and lower doors 16 17, respectively, for supplying fuel and for removing the ashes. The doors 17 also serve as dampers to regulate the draft, and to that end are hinged at their upper edges, as shown at 18 in Fig. 1. Provision is made for the automatic adjustment of the dampers 17, as will be hereinafter described.

19 20 indicate smoke-stacks placed at opposite ends and at opposite sides of the oven, as best shown in Figs. 1 and 7.

21 22 indicate flues extending across the oven at the ends thereof, said flues communicating with the stacks 19 20, respectively, and opening into the oven. By providing the stacks at the opposite sides and at the opposite ends of the oven the heat from the grates is conducted toward the ends of the oven, so that the ends even adjacent to the openings are substantially as hot as the intermediate portions of the oven. Furthermore, the location of the grates at opposite sides and at intervals throughout the oven effectually distributes the heat and maintains a substantially uniform temperature throughout the entire oven. The temperature may be varied by opening or closing the drafts.

A B C indicate endless carriers, which, as shown in Fig. 2, are arranged side by side and are adapted to move through the oven, returning over the roof thereof, as best shown in Figs. 5 and 6. As shown, each of the carriers is composed of two endless chains, consisting of links 23, connected together at their ends, the two chains of each carrier being connected by transverse rods 24, which also serve as a means of connecting the links of each chain together. The ends of the rods 24 project beyond the links in which they are carried and carry rollers 25, which are adapted to run on rails 26 provided for the purpose. The length of the rods 24 is such that the two chains composing each carrier are held at a comparatively short distance apart, forming narrow traveling conveyers, and the links 23 of each chain are of slightly-greater width than the diameter of the rollers 25, so that the conveyers are adapted to receive metal plates or trays, on which the cores are placed to be conducted through the oven.

Figure 9:
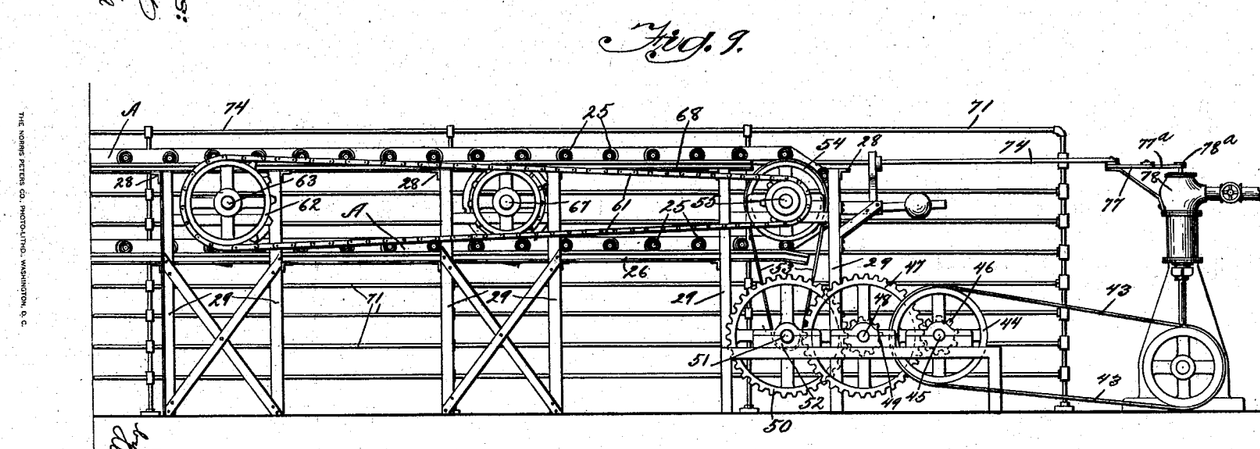
Fig. 9 is a side elevation of the discharge end of the carriers, showing the driving mechanism therefor.

As shown in Fig. 2, there are three pairs of rails extending through the oven, said rails also extending beyond the ends of the oven as far as the endless carriers go, as shown in Figs. 5 and 9. The rails 26 in the oven are mounted on suitable transverse supporting-bars 27, as shown in Fig. 2, and outside the oven they are supported by similar transverse bars 28, secured in supporting-frames 29, provided at suitable intervals, as shown in Figs. 5 and 9. The rails 26 are fixedly secured at one end to their supports; but that portion of the rails which extends through the oven to the receiving end of the apparatus rests loosely on the transverse bars 27 and 28, so that the rails are free to move longitudinally when expanding or contracting by reason of variations in the temperature of the oven. Suitable means may be provided for preventing them from being displaced laterally. In Fig. 6 I have shown the rails as being fixedly secured to a support 30, provided at the outlet end of the oven, said support being provided with a brace 31 to resist the end thrust occasioned by the expansion and contraction of the rails.

Figure 10:
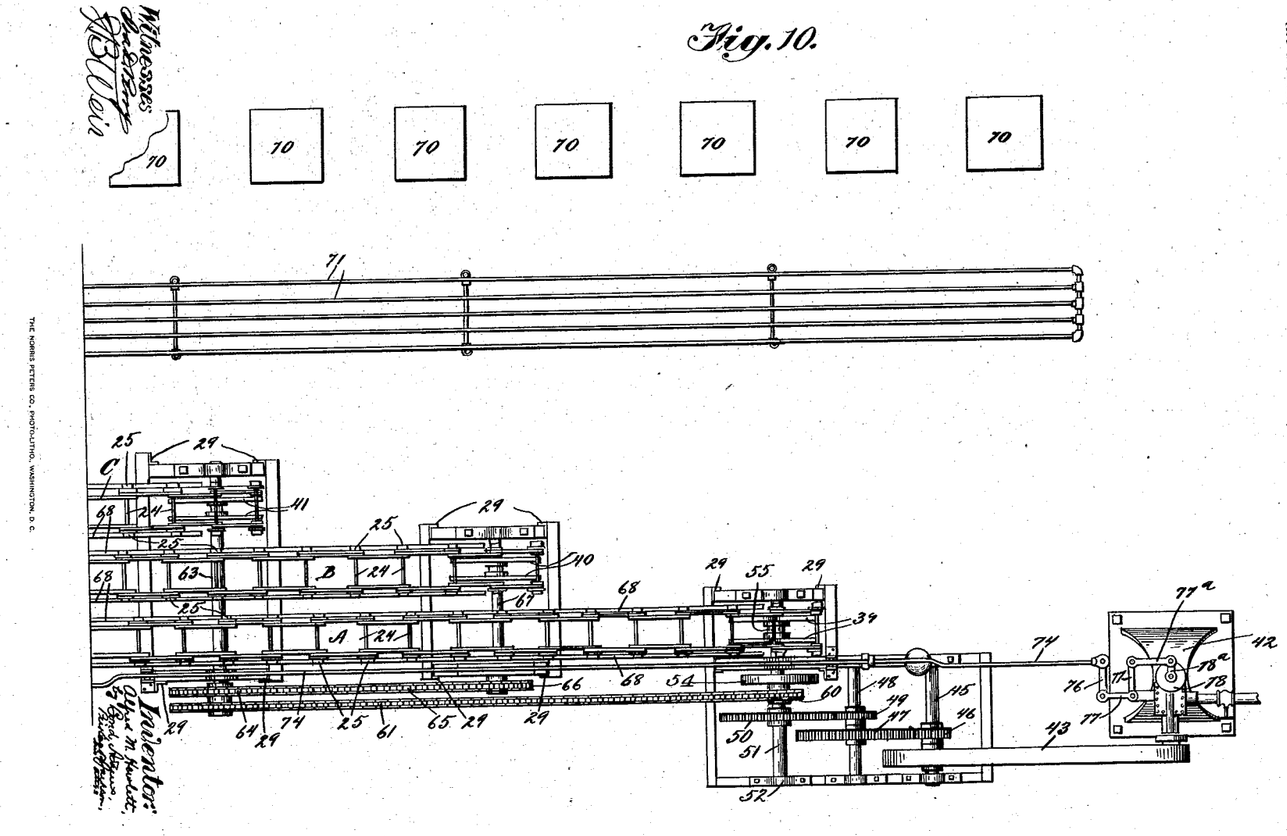
Fig. 10 is a plan view of the same, showing also the racks to which the finished cores are transferred and the position of the molding-machines with reference thereto.

32 33 34 indicate sprocket-wheels mounted at different distances from the inlet end of the oven in the supporting-frames 29, as shown in Fig. 5. The sprocket-wheels 32 33 34 are in line, respectively, with the carriers A, B, and C, said carriers passing around said sprocket-wheels, as shown in Fig. 5. The different sprocket-wheels are adjustable longitudinally of the apparatus by adjusting-bolts 35, which connect with bearing-blocks 36, in which are mounted the shafts 37 of said sprocket-wheels. The blocks 36 are adjustable longitudinally upon longitudinal bars 38, mounted in the supporting-frames 29, as shown in Fig. 5. By this construction the tension of the different carriers may be adjusted. 39 40 41 indicate similarly-driven sprocket-wheels, which are provided at the opposite ends of the carriers A B C, respectively, as shown in Fig. 10. The latter sprocket-wheels are, however, not adjustable longitudinally.

42 indicates an engine or other suitable source of power, which in the construction illustrated operates through a belt 43 and pulley 44 to drive a shaft 45. Said shaft carries a pinion 46, which meshes with a gear 47, mounted on a shaft 48, the latter shaft carrying a pinion 49, which meshes with a gear 50, carried by a shaft 51. Said shaft 51 carries a pulley 52, which is connected by a belt 53 with a pulley 54, mounted on the shaft 55 of the sprocket-wheel 39. (See Fig. 9.) Said shaft also carries a sprocket-wheel 60, which is connected by a link belt 61 with a sprocket-wheel 62, mounted on the shaft 63 of sprocket-wheel 41, which drives carrier C. The shaft 63 also carries a sprocket-wheel 64, which is connected by a link belt 65 with a sprocket-wheel 66, mounted on the shaft 67 of sprocket-wheel 40, which drives carrier B. By this construction the three carriers A B C are driven from the engine 42, but at different rates of speed, since by making the sprocket-wheel 60 of less diameter (the sprocket-wheel 66 being next larger and the sprocket-wheel 62 the largest) the carrier A moves at the highest rate of speed, the carrier B at a slower rate, and the carrier C at the slowest rate. The object of this construction is to provide for subjecting different kinds and sizes of cores to the drying temperature for different periods of time, as certain classes of cores require drying for a greater length of time than others.

Figures 3, 4:
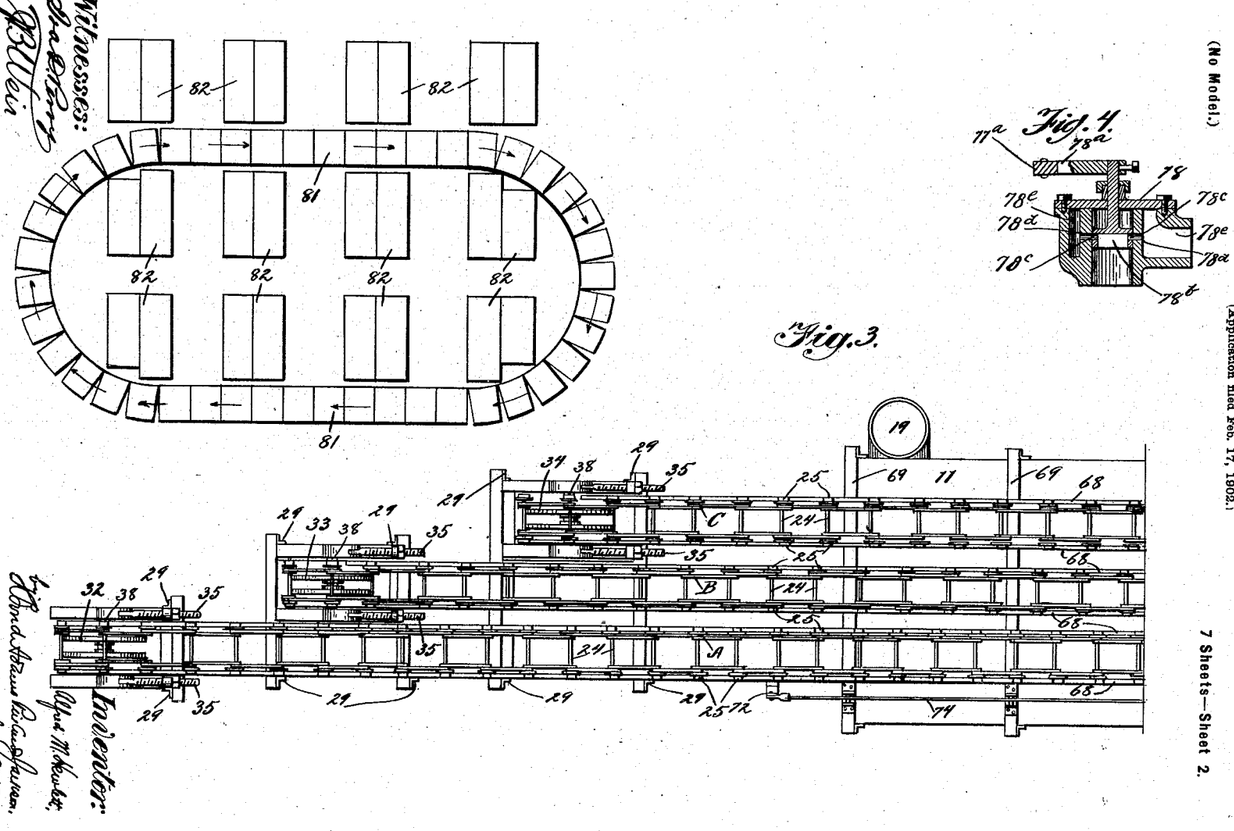
Fig. 3 is a plan view of the receiving end of the apparatus, illustrating the carriers of the baking-oven and the apparatus by which the green cores are conducted thereto.
Fig. 4 is a sectional detail of part of the controlling apparatus for regulating the speed of the carriers of the baking-oven.

While the driving apparatus as described is preferred, I wish it to be understood that my invention is not restricted to the use of the specific gearing described, as any other apparatus suitable for the purpose may be employed. It should be noted, further, that, as shown in Figs. 3 and 10, the conveyer A is considerably longer than the conveyer B, which is in turn longer than the conveyer C, and said conveyers are so arranged that both ends of conveyer A project beyond conveyer B, and likewise both ends of conveyer B project beyond conveyer C. By this construction access is readily had to each of the conveyers. Furthermore, the shortest conveyer travels the shortest distance outside the oven, thereby compensating for its reduced speed. This is quite an advantage, especially in loading the carrier C, since the articles are placed upon it nearest the inlet-opening, and consequently are carried into the oven much sooner than they would be otherwise. Of course the articles carried by the conveyer C remain in the oven a considerably longer time than those carried by either of the other conveyers. The driving apparatus is arranged so that the lower portions of the conveyers move through the oven, entering at the inlet end (shown in Fig. 5) and passing out at the end shown in Fig. 6. The upper portions of the different conveyers are supported upon rails 68, which extend over the oven 11 and from end to end of the apparatus, being supported upon transverse bars 69, placed at suitable points, as best shown in Figs. 1, 5, 6, and 9.

As shown in Figs. 6 and 9, the conveyers extend a considerable distance beyond the outlet end of the oven. The object of this arrangement is to provide for cooling the cores after they have been baked before they are removed from the conveyers. After the cores have been baked and while they are still hot they are quite tender, and if removed from the carrier or otherwise handled before they have been cooled sufficiently to set there is great danger of breakage. By extending the carriers, however, a considerable distance beyond the oven the cores are carried slowly along, meanwhile being exposed to the air, so that by the time they approach the discharge end of the apparatus they are cooled and may then be removed without danger of injury. In the drawings I have shown the carriers as moving in straight lines, the foundry (represented diagrammatically by molding-machines 70) being placed at one side of the path of the carriers near their delivery end, as shown in Fig. 10. The carriers may, however, be arranged to carry the baked cores to one side or the other, if desired. In the arrangement shown core-racks 71 are provided between the conveyers and the foundry, as shown in Figs. 9 and 10. Said racks are adapted to receive the cores when taken from the carriers. The cores are then taken from the other side of the racks and carried by hand to the molding-machines or to the part of the foundry where they are to be used.

Figure 8:
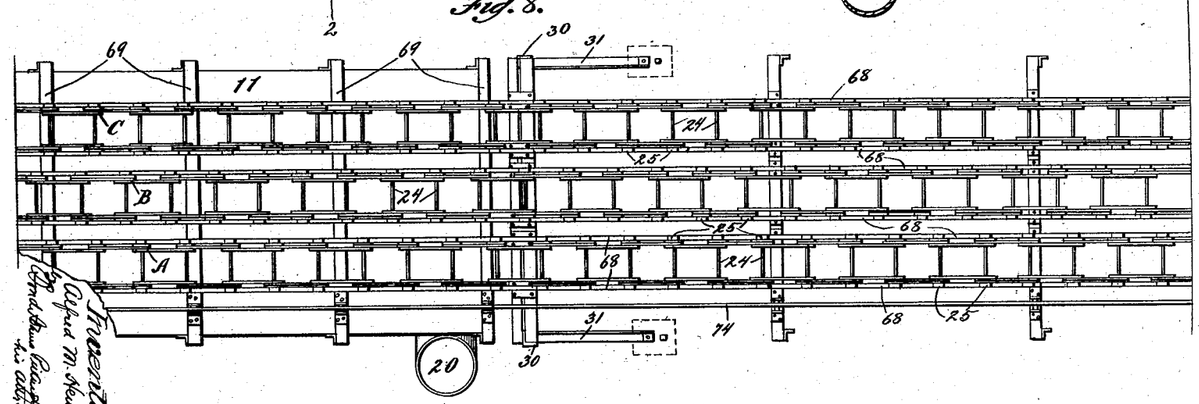
Fig. 8 is a plan view of the outlet end of the oven and illustrating also the carriers.

The speed of the conveyers is regulated by the heat of the oven, and to this end the expansion and contraction of the rails 26 are utilized to control the speed of the engine 42. I prefer to use only one of the rails for this purpose. As already described, the rails 26 are secured to the support 30 near the outlet end of the oven 11, as shown in Fig. 6. Consequently the expansion or contraction of the rails, due to the heat of the oven, causes the ends of the rails at the receiving end of the apparatus to move longitudinally to a greater or less extent, depending on the variations in temperature. To utilize this movement, a lever 72 is provided, pivoted at its lower end to a suitable support 73, arranged near the inlet end of the oven, as shown in Fig. 5. To the upper end of the lever 72 is connected a connecting-rod 74, (best shown in Figs. 5, 8, and 10,) which is connected to a bell-crank lever 76, which is in turn connected to another bell-crank lever 77, which operates a controller or governor 78, carried on the engine 42. The controller 78 may be of any approved construction suitable for varying the speed of the engine when properly operated, the arrangement being such that when the bell-crank lever 77 is rocked in one direction the speed of the engine is increased, and when rocked in the opposite direction the speed is reduced. In Figs. 4, 9, and 10 I have illustrated a form of apparatus suitable for this purpose. As therein illustrated, the lever 77 is connected by the link $77^a$ with a crank $78^a$, which operates the controller 78. The controller proper, as shown in Fig. 4, consists of a rotary valve $78^b$, the crank $78^a$ being secured upon the stem thereof, so that by swinging said crank the valve may be partially rotated. The valve $78^b$ is provided with passages $78^c$, adapted to register with passages $78^d$, which communicate with the steam-passage $78^e$, the arrangement being such that by rotating the valve $78^b$ the area of the steam-inlet may be increased or diminished and the speed of the engine varied accordingly. By this construction it will be seen that if the temperature of the furnace falls the speed of the conveyers is reduced, and the cores are thereby subjected for a longer period of time to the lower temperature, as is necessary to properly bake them. Similarly, if the temperature of the oven rises the speed of the conveyers is increased, so that they are not subjected to the higher heat for so long a time, and consequently are not overbaked. In a similar manner the temperature of the oven automatically controls the drafts, since the rod 74 is connected by chains 79 or other suitable flexible connections to the ash-pit doors or dampers 17, said chains running over pulleys 80, as shown in Fig. 1. As shown in Fig. 1, when the rails 26 expand the upper end of the lever 72 moves in the direction indicated by the arrow in said figure. Consequently the rod 74 is moved in the same direction, thereby slacking the chains 79 and lowering the dampers 17. When the rail 26 cools, and consequently contracts, the rod 74 moves in the opposite direction, consequently opening the dampers 17. A similar lever, connecting-rod, and chains are provided at both sides of the oven; but only one of said connecting-rods extends to the engine.

The green cores are carried to the baking apparatus by means of a conveyer 81, which receives the cores from the tables 82 at which they are formed and conducts them to the carriers, as shown in Fig. 3. Said conveyer 81 is represented diagrammatically in Fig. 3 for the purpose of illustrating the fact that it is arranged to conduct the green cores from the place where they are formed to the carriers of the baking apparatus, and it should be understood that the shape and the direction of travel of said conveyer 81 may be varied to suit local conditions. By thus conveying the green cores to the baking apparatus they are handled only once—to wit, when they are transferred from the conveyer 81 to the carriers of the baking apparatus—and thus are much less liable to injury than has heretofore been the case.

Instead of having the conveyers return over the oven, as shown in the drawings, any other equivalent construction and arrangement may be employed, although the construction shown and described is considered the best.

From the foregoing description it will be seen that the oven is maintained at substantially a uniform temperature throughout and that such temperature is maintained at substantially a constant point by automatically-operating mechanism. While considerable variations in temperature are not apt to occur, even slight changes at once vary the speed of the carriers, so that the baking effect is practically invariable, the cores moving through the oven faster when it is hot and slower when it is cooler. Furthermore, by subjecting the cores to direct heat, as is the case in the apparatus described, they are baked more quickly and thoroughly, with a consequent improvement in the character of the finished cores. The object of conducting the cores into and through the oven and for a sufficient distance thereafter outside the oven to enable them to cool before being handled has already been set forth, and I would say, further, that I have found by practical experience that a very important saving is attained by my improved process owing to the great reduction in the loss through damage to the cores as compared with the results secured by methods heretofore employed.

For heating the oven I preferably employ coke or oil, but wood and coal may also be used, anthracite coal especially being quite a satisfactory fuel. The temperature employed should be somewhere between 400° and 700° Fahrenheit in order to produce the best results.

That which I claim as my invention, and desire to secure by Letters Patent, is—

1. The method of baking cores which consists in moving the cores continuously into, through and out of an oven elongated in the line of movement of the cores, the oven being heated to a baking temperature substantially uniform from end to end thereof, substantially as described.

2. The method of baking cores which consists in moving the cores on a suitable support continuously into, through and out of an oven elongated in the line of movement of the cores, the oven being heated to a baking temperature substantially uniform from end to end thereof, and permitting the cores to remain on the support after leaving the oven, until cool, substantially as described.

3. The method of baking cores which consists in moving them continuously through an oven heated uniformly to a suitable baking temperature by direct heat, substantially as described.

4. The method of baking cores, which consists in moving the cores continuously through an oven heated to a suitable baking temperature on continuously-moving supports and in continuously carrying the cores on such supports, after leaving the oven, for a sufficient distance outside the oven to permit them to cool and harden before being handled, substantially as described.

ALFRED M. HEWLETT.

Witnesses:
H. L. DAY,
W. T. PIERCE.